Figure 1:
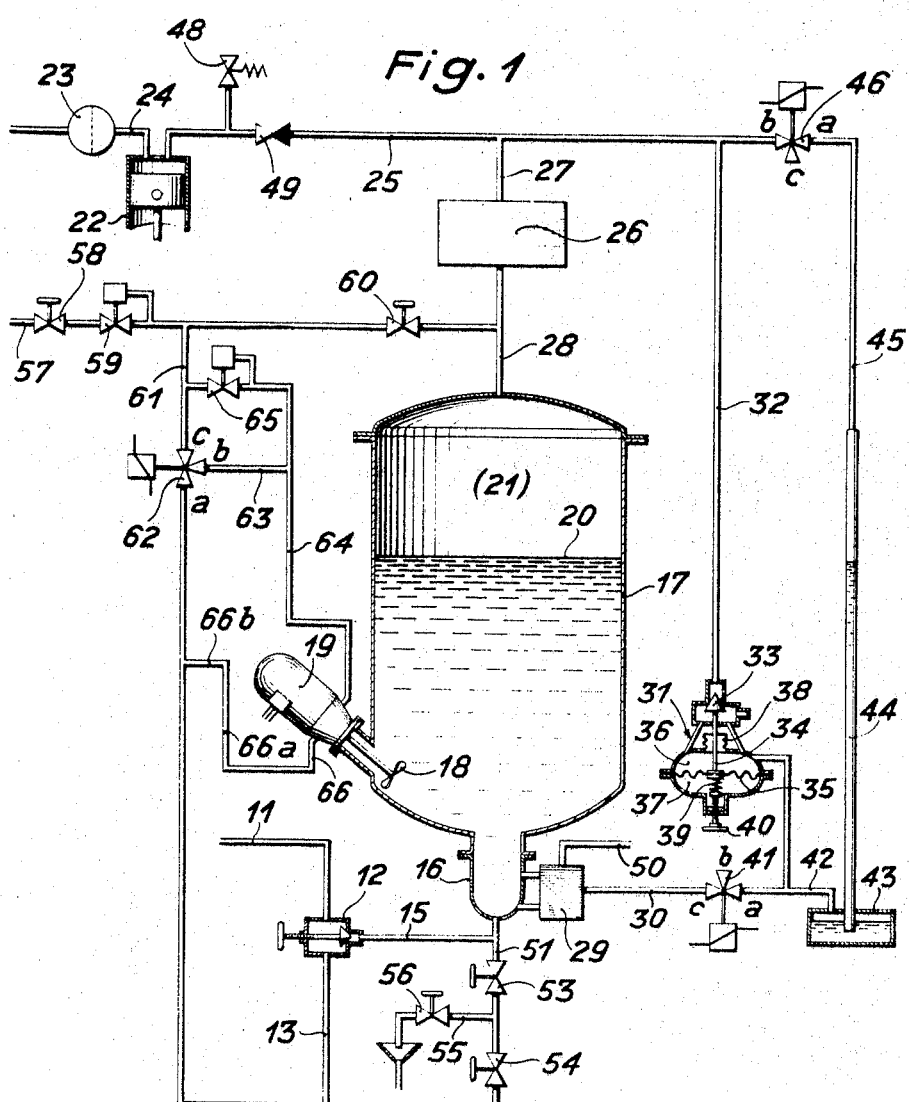

Inventor:
MARTIN FROELICH

United States Patent Office 3,428,413
Patented Feb. 18, 1969

3,428,413
LIQUID COMPENSATING APPARATUS FOR USE IN COMBINATION WITH A LIQUID STERILIZATION AND RACKING SYSTEM
Martin Froelich, Grunegg, Konolfingen, Bern, Switzerland, assignor to Sulzer Brothers, Limited, Winterthur, Switzerland, a corporation of Switzerland
Filed Jan. 3, 1966, Ser. No. 518,433
Claims priority, application Switzerland, Jan. 8, 1965, 234/65
U.S. Cl. 21—103          5 Claims
Int. Cl. A61l 3/02

This invention relates to a liquid compensating apparatus for controlling the flow of sterile liquids from a sterilization plant to a racking station. More particularly, this invention relates to a sterile liquid compensating apparatus for maintaining a constant pressure on the flow of sterile liquids from a sterilization plant to a racking station.

Sterilization plants are available for sterilization of liquid foods, e.g. milk, fruit juices, or pharmaceutical adjuvants or the like, such sterilization being obtained by heating the liquids for a short period without any adverse effects. Milk, for example, is combined under pressure with heated steam and is thus abruptly heated to a temperature of about 150° C.; the pressure is then immediately reduced with a corresponding evaporation cooling, the period of the actual heating being limited to just a few seconds or even fractions of a second.

Liquids sterilized in this way can be kept for a relatively long period provided that re-infection is prevented. This means that the path for the liquid between the sterilization plant and an aseptic racking station supplied by the sterilization plant must be completely sterile. Racking, of course, must also be carried out under fully aseptic conditions. Systems are available at the present time whereby, for example, milk and other liquid foods can be aseptically packed in pre-sterilized disposable packings.

Racking machines for these purposes operate with a substantially constant output. A plurality of racking stations can usually be supplied with sterilized liquid from one sterilization plant if the sterilization plant is operated with a variable output and only some of the racking stations are in operation. If, however, the output of the sterilization plant cannot be varied or adjusted as required, then the sterilized liquid must be stored before being delivered to the racking station in a quantity corresponding to the capacity of the racking station. Such intermediate storage is also necessary if a single sterilization plant has to deal with different liquids; in such cases the sterilization plant will operate intermittently and if the sterilization plant and the racking station are directly coupled, the racking machines will only be inadequately utilized in some cases. In such a case intermediate storage enables the racking stations to be supplied with sterilized liquid even if the sterilization plant is provisionally out of operation.

Intermediate storage of the liquid coming from the sterilization plant makes considerable demands. The entire path for the liquid must be capable of complete pre-sterilization and there must be complete aseptic change-over to the actual operative condition. Moreover, the liquid pressure in the exit pipe of any intermediate tank must not vary, since it would endanger the operation of the racking machine. It must also be possible to withdraw a sterile gas from or introduce the same into the space above the level of liquid in any intermediate storage tank, depending upon whether the level of liquid rises or falls. Finally since the racking station racking system usually operates in dependence upon pressure, a constant pressure is therefore required in the racking pipe to ensure a constant flow.

The invention satisfies these requirements and offers a practically complete guarantee of aseptic conditions at a constant liquid pressure in the feed pipe to the racking machines. The invention is characterized by a compensating tank which is closed on all sides, is connected to the liquid path between the sterilization plant and the racking station, and has a sterile liquid chamber; by a source for a sterile high-pressure gas which communicates with the space above the level of liquid in the compensating tank; by a sensing element for the pressure in the path of the liquid between the sterilization plant and the racking station, such sensing element so acting on means for influencing the gas pressure above the level of liquid in the tank that the liquid pressure remains at least approximately constant with a varying level of liquid in the tank.

Figure 2:
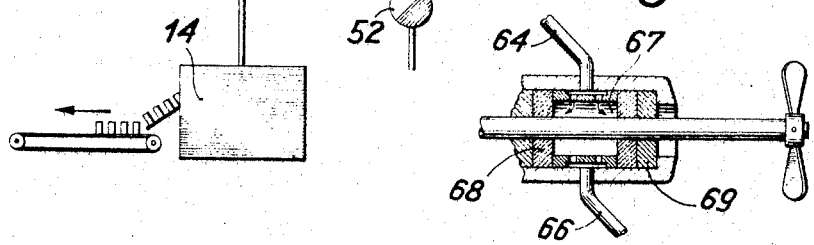

The invention and other associated features are explained in detail hereinafter with reference to the exemplified embodiment illustrated in the drawings wherein FIG. 1 diagrammatically illustrates a compensating tank in the path of liquid between a sterilization plant and a racking station together with the pipe lines and elements required for sterilization and operation, while FIG. 2 is a detail of a barrier chamber for the shaft of an agitator shown in the tank in FIG. 1, such chamber being intended for presterilization and aseptic sealing.

Referring to the drawings, the sterilized liquid flows through pipe 11 to valve 12 from a sterilization plant (not shown) and then on through pipe 13 to the diagrammatically illustrated aseptic racking and packing machine 14. The liquid path formed by pipes 11 and 13 is connected to the connection chamber 16 of the compensating tank 17 via the pipe 15. The tank is hermetically sealed on all sides. The bottom part of the tank contains an agitator consisting of a propeller 18 and a drive motor 19.

A high-pressure sterile gas can be fed to the space 21 above the level of liquid 20 in the tank. To this end, an air pump 22, which is preferably in the form of an oil-free piston compressor, draws it in through pipe 24 via the coarse filter 23 and delivers it at high pressure to the pipe 25, from which branches the pipe 27 leading to the sterile air filter 26. The entrained germs are completely eliminated from the air in the filter. The source of sterile high-pressure air consisting of the parts 23–27 is connected to the space 21 via the pipe 28. Pipe 25 also contains a safety valve 48 and a non-return valve 49.

The pressure sensing element 29 communicates with the connection chamber 16 and detects the total pressure, made up of the gas pressure in the space 21 and the static pressure of the column of liquid in the tank 17, and emits in known manner a pressure signal equal to such pressure via the control air line 30 to the pressure controller which has been given the general reference 31. Pressure air is fed through line 50 to the transmitter part of the sensing element 29 in known manner. This pressure air is intended to maintain in the line 25 and hence also in the space 21, a gas pressure such that the liquid pressure detected by the sensing element 29 at the base of the compensation tank remains at least approximately constant even for a variable level of liquid. To this end, a blow-off pipe 32 branches from pipe 25 and its exit cross-section is controlled by means of the valve 33. The valve 33 is actuated by the rod 34 secured to the diaphragm 35 of a servomotor influenced by the pressure in the pipe 30. Diaphragm 35 separates the two chambers 36 and 37; the control air pipe 30 leads into the chamber 36 which is sealed from the rod 34 by a bellows 38. The desired pressure in pipe 25 and hence in chamber 21 is adjusted by means of a coil spring 39 which acts on the diaphragm and the compression of which can be varied by means of the hand wheel 40.

The pipe 30 contains a three-way magnetic valve 41; a pipe 42 branches from pipe 30 and leads to the gas space 43 of a level indicator 44. The top end of the level tube communicates with the pipe 25 via the pipe 45 and the three-way magnetic valve 46 in such a manner that the level of liquid in the tank 17 is denoted by the level of liquid in the level tube.

The pipe 15 is connected via pipe 51 to a steam trap 52; pipe 51 also contains the two gate valves 53 and 54 between which is connected an emptying pipe 55 containing a gate valve 56.

Before the apparatus illustrated is put into operation, proper pre-sterilization is required. Saturated steam fed from a suitable source via pipe 57 is used for this purpose, such pipe containing the gate valve 58, pressure control valve 59 and gate valve 60. Pipe 57 leads to pipe 28 so that when the tank 17 is initially empty the interior of the tank and the pipes 15 and 13 can be sterilized by the steam. The path for the sterile air from filter 26 is pre-sterilized at the same time.

Pipe 61 branches from pipe 57 after the pressure control valve 59 and leads to pipe 51 between the valve 54 and the steam trap 52. Pipe 61 contains the three-way magnetic valve 62 connecting pipe 61 to pipe 63, the latter leading to pipe 64. Pipe 64 is connected via pressure control valve 65 to pipe 61 and to a lantern-like chamber 67, (see FIG. 2) between the seals 68 and 69 for the shaft 18 of the agitator 19. From chamber 67 a pipe 66 returns to pipe 61 via a vertical portion 66a and a horizontal portion 66b.

The pressure control valve 59 is so set, for example, that the steam flowing from pipe 57 is expanded to a constant pressure, say 3 kg. per sq. cm. The pressure control valve 65 is so set as to reduce the steam pressure in pipe 61, for instance, to 1.2 kg. per sq. cm.

Prior to actual operation the plant is pre-sterilized with the valves 58, 60, 54 and 53 open but with the valves 12, 56 and 33 shut and with the three-way valve 62 set to flow path ac, the three-way valve 41 set to the flow path ab and with the three-way valve 46 set to the flow path ac; of course the compressor 22 will be operative. In this state of operation, the pressure control valve 65 is bridged by pipe 63 so that steam is available directly from pipe 61 to pipe 64 for sterilizing the barrier chamber for the shaft of the agitator 19.

Pre-sterilization must be continued until all the parts requiring sterilization have been heated to sterilization temperature by the heated steam.

On conclusion of the pre-sterilization operation, compressor 22 remains in operation and the valves 60, 12, 54, 56 and 53 are closed and valve 33 opened. Valve 58 remains in the open position. The three-way valve 62 is set to the flow with ab, three-way valve 41 is set to flow path ac and three-way valve 46 to flow path ab. The supply of steam to pipe 28 is thus interrupted but steam can still flow to pipe 61. Since flow path ac is shut off, steam of reduced pressure flows to pipe 64 and is sufficient to maintain sterile conditions in the agitator shaft barrier chamber; chamber 67 fills with sterile condensate which can flow off through the overflow pipe 66b.

Sterilized liquid can now be supplied from the sterilization plant via pipe 11 and can flow on to the racking station 14. If the amount of liquid supplied exceeds the capacity of the racking station 14, a corresponding amount of liquid flows through pipe 15 to the compensating tank 17, the gate valve 12 being open. The level of liquid in the compensating tank thus rises. The gas pressure in the space 21 assumed its maximum value when the tank was empty; the gas pressure is controlled by the presure sensing element 29 which influences the blow-off valve 33 when the tank 17 is empty to give a constant value for this maximum pressure.

With an increasing level of liquid the pressure sensing element 29 receives not only the pressure component from the gas pressure in the space 21 but also the component formed by the increasing static liquid pressure. However, the element 29 prevents any increase in the total pressure it detects, this effect being achieved by further opening of valve 33 so that the gas pressure in the space 21 is reduced by an amount corresponding to the static liquid pressure now existing. The liquid pressure at the base of the tank 17 and hence in the pipe 13 thus always remain constant even for a varying level of liquid in the tank.

The invention is not limited to the exemplified embodiment illustrated. For example, a different sterile gas may be introduced into the space above the level of liquid in the compensating tank, for example an inert gas, such as nitrogen. It would also be possible to use pressure sensing elements or control means of a different construction to vary the gas pressure in the compensating tank.

What is claimed is:

1. A liquid compensating apparatus for maintaining a constant pressure on a flow of sterilized liquid in a flow path, said apparatus comprising:
   a compensating tank for connection at a lower portion thereof to a flow path from a sterilization plant to a racking station, said compensating tank having an enclosed interior for storing sterilized liquid from the sterilization plant,
   means including a sterile gas filter in communication with the upper portion of said interior of said compensating tank for supplying sterilized high pressure gas thereto above stored sterilized liquid,
   a pressure sensing element for sensing the pressure at said lower portion of said compensating tank, and
   means responsive to said pressure sensing element for varying the pressure of said sterilized gas in said compensating tank to maintain a constant pressure at said lower portion of said compensating tank with varying levels of liquid therein.

2. A liquid apparatus as set forth in claim 1 wherein said means responsive to said pressure sensing element includes a blow off pipe communicating with said means for supplying sterilized high pressure gas and a pressure controller for varying the pressure of said gas in said compensating tank interior.

3. A liquid compensating apparatus as set forth in claim 1 which further comprises a fluid level indicator in communication with said compensating tank interior for indicating the level of liquid in said compensating tank.

4. A liquid compensating apparatus as set forth in claim 1 further comprising;
   means connected to said compensating tank for sterilization said interior of said compensating tank before the introduction of gas or sterilized fluid therein.

5. A liquid compensating apparatus as set forth in claim 4 which further comprises a sealed agitator in said compensating tank, said agitator being connected to said sterilizing means for sterilization of said agitator.

References Cited

UNITED STATES PATENTS

| | | | |
|---|---|---|---|
| 2,020,849 | 11/1935 | Muller | 137—209 |
| 2,321,631 | 6/1943 | Sibal | 137—209 XR |
| 3,144,036 | 8/1964 | Rice | 137—209 XR |
| 3,334,643 | 8/1967 | Shamos | 137—209 XR |

MORRIS O. WOLK, *Primary Examiner.*

BARRY S. RICHMAN, *Assistant Examiner.*

U.S. Cl. X.R.

21—61; 99—249; 137—209